(12) United States Patent
Lawrenson et al.

(10) Patent No.: US 11,397,799 B2
(45) Date of Patent: Jul. 26, 2022

(54) USER AUTHENTICATION BY SUBVOCALIZATION OF MELODY SINGING

(71) Applicant: Telefonaktiebolaget LM Ericsson (publ), Stockholm (SE)

(72) Inventors: Matthew John Lawrenson, Bussigny (CH); Lars Andersson, Solna (SE); Till Burkert, Huddinge (SE); Jacob Ström, Stockholm (SE); Jan Jasper Van Den Berg, Lausanne (CH)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 815 days.

(21) Appl. No.: 16/320,009

(22) PCT Filed: Oct. 3, 2016

(86) PCT No.: PCT/EP2016/073556
§ 371 (c)(1),
(2) Date: Jan. 23, 2019

(87) PCT Pub. No.: WO2018/065029
PCT Pub. Date: Apr. 12, 2018

(65) Prior Publication Data
US 2019/0272364 A1 Sep. 5, 2019

(51) Int. Cl.
*G06F 21/00* (2013.01)
*G06F 21/32* (2013.01)
(Continued)

(52) U.S. Cl.
CPC .............. *G06F 21/32* (2013.01); *G06F 21/31* (2013.01); *G10L 17/08* (2013.01); *G10L 17/24* (2013.01);
(Continued)

(58) Field of Classification Search
CPC ......... G06F 21/32; G06F 21/31; G10L 17/08; G10L 17/24; G10L 25/90; H04L 63/08; H04L 63/0861; H04W 12/06
See application file for complete search history.

(56) References Cited

U.S. PATENT DOCUMENTS 9,286,899 B1 3/2016 Narayanan
9,495,525 B2 * 11/2016 Grigg ..................... H04L 63/08
(Continued)

FOREIGN PATENT DOCUMENTS

JP 2010060947 A 3/2010

OTHER PUBLICATIONS

Chen, Y., et al., "Your Song Your Way: Rhythm-Based Two-Factor Authentication for Multi-Touch Mobile Devices", Proceedings of 34th IEEE Annual Conference on Computer Communications and Networks, Apr. 26, 2015, pp. 2686-2694, IEEE.
(Continued)

*Primary Examiner* — Jeffrey C Pwu
*Assistant Examiner* — William A Corum, Jr.
(74) *Attorney, Agent, or Firm* — Coats + Bennett, PLLC

(57) ABSTRACT

A computing device (300) for authenticating a user (110), such as a mobile phone, a smartphone, a tablet, or the like, is provided. The computing device is operative to acquire a representation of a melody generated by the user, and authenticate the user in response to determining that the acquired representation of the user-generated melody and a representation of a reference melody fulfil a similarity condition. The user-generated melody may either be vocalized or subvocalized. If the melody is vocalized, the representation is derived from audio data captured by a microphone (102). If the melody is subvocalized, the representation is derived from nerve signals captured by sensors attached to the throat (111) of the user, or from a
(Continued)

video sequence acquired from a camera (103), the video sequence capturing one or more body parts (111-115) of the user subvocalizing the melody, by magnifying motions of the one or more body parts which are correlated with the subvocalized melody.

27 Claims, 8 Drawing Sheets

(51) Int. Cl.
| | | |
|---|---|---|
| | *G10L 17/08* | (2013.01) |
| | *G10L 17/24* | (2013.01) |
| | *G10L 25/90* | (2013.01) |
| | *H04W 12/06* | (2021.01) |
| | *H04L 9/40* | (2022.01) |
| | *G06F 21/31* | (2013.01) |

(52) U.S. Cl.
CPC ............. *G10L 25/90* (2013.01); *H04L 63/08* (2013.01); *H04L 63/0861* (2013.01); *H04W 12/06* (2013.01)

(56) References Cited

U.S. PATENT DOCUMENTS

| | | | | |
|---|---|---|---|---|
| 10,587,594 | B1* | 3/2020 | McClintock | G06F 21/36 |
| 11,138,297 | B2* | 10/2021 | Vargas | G06F 21/31 |
| 2002/0152078 | A1* | 10/2002 | Yuschik | G10L 17/14 |
| | | | | 704/273 |
| 2006/0129394 | A1 | 6/2006 | Baker et al. | |
| 2007/0106501 | A1* | 5/2007 | Morita | G16H 40/20 |
| | | | | 704/200 |
| 2009/0094690 | A1* | 4/2009 | Hayashi | G06F 21/31 |
| | | | | 726/7 |
| 2010/0036657 | A1 | 2/2010 | Morisaki et al. | |
| 2014/0310764 | A1* | 10/2014 | Tippett | G06F 21/31 |
| | | | | 726/1 |
| 2015/0254444 | A1* | 9/2015 | Herger | G06F 3/023 |
| | | | | 726/19 |
| 2017/0116995 | A1* | 4/2017 | Ady | H04W 12/06 |
| 2017/0359334 | A1* | 12/2017 | Maddox | G10L 17/06 |
| 2020/0286490 | A1* | 9/2020 | Scanlon | G10L 17/10 |

OTHER PUBLICATIONS

Gibson, M. et al., "Musipass: Authenticating Me Softly with "My" Song", Proceedings of the 2009 workshop on New security paradigms workshop, Sep. 8, 2009, pp. 85-100, Oxford, United Kingdom.

Wang, A., "An Industrial-Strength Audio Search Algorithm", Proceedings of the 4 th International Conference on Music Information Retrieval, Oct. 26, 2003, pp. 1-7, Shazam Entertainment, Ltd.

Wu, H-Y., et al., "Eulerian Video Magnification for Revealing Subtle Changes in the World", Article in ACM Trans. Graph, Jan. 1, 2012, vol. 31, pp. 65:1-65:8, obtained from internet: https://people.csail.mit.edu/mrub/papers/vidmag.pdf.

Wadhwa, N. et al., "Phase-Based Video Motion Processing", Journal, ACM Transactions on Graphics (TOG), vol. 32 Issue 4, Article No. 80, Jul. 1, 2013, pp. 1-9, ACM, NY, US.

Elgharib, M., et al., "Video Magnification in Presence of Large Motions", 2015 IEEE Conference on Computer Vision and Pattern Recognition (CVPR), Dec. 7, 2015, pp. 4119-4127, IEEE.

Bandi, Y. et al., "Subvocal Speech Recognition System based on EMG Signals", International Journal of Computer Applications (0975-8887), International Conference on Computer Technology (ICCT 2015), ICCT 2015 —No., Sep. 1, 2015, pp. 31-35, IJCA Journal.

Salamon J. et al., "Melody Extraction From Polyphonic Music Signals Using Pitch Contour Characteristics", IEEE Transactions on Audio, Speech, and Language Processing, vol. 20, No. 6, Aug. 1, 2012, pp. 1759-1770, IEEE.

Salamon, J. et al., "Statistical characterisation of melodic pitch contours and its application for melody extraction", Conference paper, Oct. 1, 2012, pp. 1-6, International Society for Music Information Retrieval.

\* cited by examiner

Fig. 6
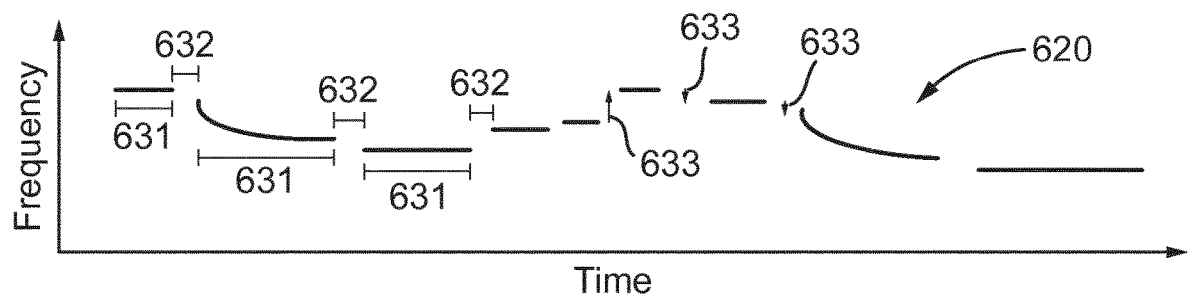
Fig. 7
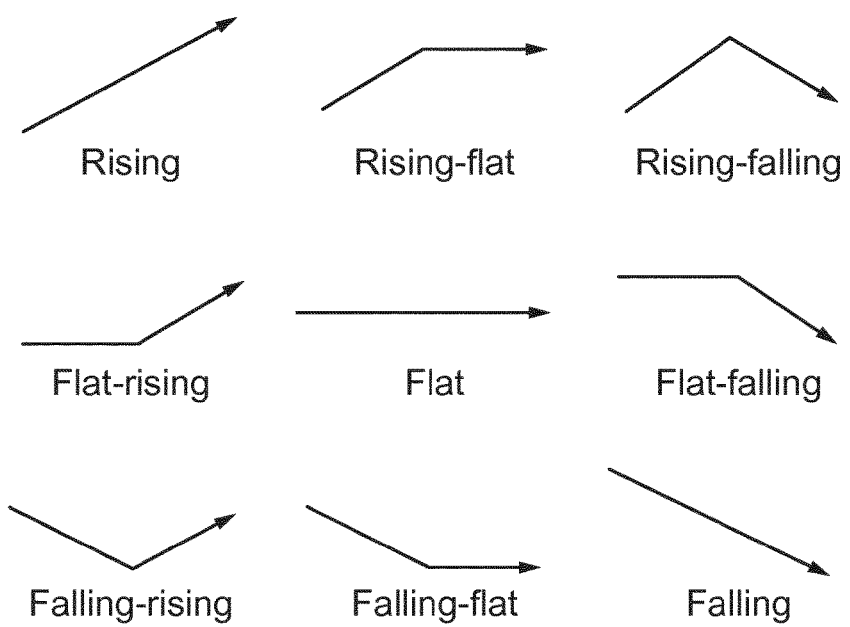

USER AUTHENTICATION BY SUBVOCALIZATION OF MELODY SINGING

TECHNICAL FIELD

The invention relates to a computing device for authenticating a user of the computing device, a method of authenticating a user of the computing device, a corresponding computer program, and a corresponding computer program product.

BACKGROUND

Known solutions for authenticating a user, e.g., for granting access to a computing device such as a mobile phone, or to a service such as online banking, oftentimes rely on shared secrets such as passwords. These solutions suffer from various security weaknesses including data breaches and are susceptible to brute-force guessing. Moreover, passwords are easily forgotten by the user, which introduces additional security issues including repeated use of the same passwords, use of easy-to-remember passwords which are based on information related to the user, such as the partner's name or the user's date of birth, insecure storage of passwords, and problems arising from the use of password-reset or -recovery solutions. The rise of small and simple keyboards on smartphones and portable devices also reinforces the use of simple passwords, as users favor brevity due to an increased effort in typing on small keyboards.

Alternative solutions which rely on biometric information, such as fingerprint sensors and iris scanners, have the advantage that users do not need to remember any password or other data. Instead, such solutions rely on unique biological information of the user, e.g., fingerprints or iris patterns, which are matched against stored reference information. However, such solutions are vulnerable to data breaches and have the disadvantage that, once the biometric data has been compromised, it is difficult to change and the compromised biometric information can accordingly no longer be used for authentication. In addition, some biometric information may also be stolen or faked, e.g., by means of a voice recording or a face mask for authentication schemes based on voice or face recognition, respectively.

Also known are authentication schemes which are based on recognition of songs by the user (see, e.g., "Musipass: authenticating me softly with "my" song", by M. Gibson, K. Renaud, M. Conrad, and C. Maple, Proceedings of the 2009 workshop on New security paradigms (NSPW '09), pages 85-100, ACM New York, 2009).

SUMMARY

It is an object of the invention to provide an improved alternative to the above techniques and prior art.

More specifically, it is an object of the invention to provide improved solutions for authenticating a user of a computing device, such as a mobile phone, a mobile terminal, a smartphone, a tablet, a personal computer, a computer display, a television, a media player, or a laptop. In particular, it is an object of the invention to provide improved solutions for authenticating a user based on a melody generated by the user.

These and other objects of the invention are achieved by means of different aspects of the invention, as defined by the independent claims. Embodiments of the invention are characterized by the dependent claims.

According to a first aspect of the invention, a computing device for authenticating a user of the computing device is provided. The computing device comprises processing means operative to acquire a representation of a melody generated by the user, and authenticate the user in response to determining that the acquired representation of the melody generated by the user and a representation of a reference melody fulfil a similarity condition.

According to a second aspect of the invention, a method of authenticating a user of a computing device is provided. The method is performed by the computing device and comprises acquiring a representation of a melody generated by the user, and authenticating the user in response to determining that the acquired representation of the melody generated by the user and a representation of a reference melody fulfil a similarity condition.

According to a third aspect of the invention, a computer program is provided. The computer program comprises computer-executable instructions for causing a device to perform the method according to an embodiment of the second aspect of the invention, when the computer-executable instructions are executed on a processing unit comprised in the device.

According to a fourth aspect of the invention, a computer program product is provided. The computer program product comprises a computer-readable storage medium which has the computer program according to the third aspect of the invention embodied therein.

The invention makes use of an understanding that music, e.g., in the form of sung songs, or hummed or whistled melodies, offer a number of advantages over passwords and other conventional user authentication methods. This is the case since people tend of have a large internal database of known songs/melodies which they are regularly adding to. The number of songs/melodies a person can readily remember is large and varied, meaning that their use as a response in a challenge-response authentication scheme leads to a solution which is relatively difficult to crack using brute-force methods.

To this end, the user is authenticated if it is determined that a representation of a melody generated by the user, which may either be vocalized, e.g., by singing, humming, or whistling, or subvocalized, is sufficiently similar to a representation of a reference melody. The user may either be authenticated to access the computing device, or to access a separate device or a service. In the latter scenarios, an embodiment of the computing device is used to facilitate authentication to another device or a service in a multi-factor authentication scheme.

There exist a variety of definitions for what a "melody" is:
  The succession of single tones in musical compositions, as distinguished from harmony and rhythm.
  The principal part in a harmonic composition.
  The "strongest" pitch (i.e., frequency) in the likely melody range at a given time.
  The single (monophonic) pitch sequence that a listener might reproduce if asked to whistle or hum a piece of polyphonic music, and which the listener would recognize as being the "essence" of that music when heard in comparison.

For the purpose of elucidating embodiments of the invention, the latter definition is adopted throughout this disclosure.

Since it is clear that what constitutes the actual melody of a piece of music is somewhat subjective, two people, or users of a computing device, may have different views as to what the essence of a piece of music is. For instance, two sections of a melody may have a joining sequence, which some may consider to be an essential part of the melody, and others not. Considering the song "Yesterday" by The Beatles as an example, some people may consider the melody to be "Yesterday . . . all my troubles seemed so far away", whilst others might consider it to be "Yesterday da dum all my troubles seemed so far away". It will also be appreciated that rhythm, in addition to pitch, may be considered in determining that an acquired representation of a user-generated melody and a representation of a reference melody fulfil a similarity condition.

Hence, any scheme for comparing and judging whether a user-generated melody has been reproduced sufficiently accurately in comparison with the reference melody is to be based on a confidence score, or degree of similarity, rather than an absolute comparison. In practice, this means that the similarity condition is considered fulfilled if the user-generated melody and the reference melody are in sufficient agreement, as is described in further detail below. This is similar to authentication schemes based on biometric authentication, e.g., involving fingerprints, voice recognition, or iris patterns, which all rely on comparing a sample obtained from the user during the authentication process, and assessing whether the obtained sample is in agreement with a reference sample to sufficient extent, oftentimes defined by a threshold value to which a measure of similarity is compared. For instance, this may be achieved by identifying characteristic features in the user sample (user-generated melody) and the reference sample (reference melody), and assessing whether a sufficiently large fraction of characteristic features is present in both samples.

In general, embodiments of the invention are not limited to melodies of what is considered to be a piece of music or a song. Rather, a melody may also be present in any utterance which a person generates, either vocalized or subvocalized, e.g., by speaking or thinking a word or a sentence.

In the present context, a representation of a melody is considered to be any type of data representing a melody, either generated by the user or a stored reference melody, and which may be used for comparison with a corresponding representation of another melody. Such comparison may, e.g., be based on the melody itself, a signature of the melody, a pitch sequence or pitch contours of the melody, a hash of the melody, or the like, as is elucidated further below. Depending on the type of representation, comparison can be made between different types of melodies, including original music, i.e., a recorded song which may be stored, downloaded, or streamed, vocalized melodies which are audibly generated by the user, e.g., by singing, humming or whistling, and melodies which are subvocalized by the user.

Subvocalization is the "internal speech" while reading or listening to music and is characterized by minute movements of the larynx and other speech muscles, as well as other body parts, which are imperceptible to the human eye but detectable by technical means.

According to an embodiment of the invention, the representation of the melody generated by the user is acquired by acquiring audio data of the user vocalizing the melody, i.e., audibly generating the melody, e.g., by singing, humming, or whistling, and deriving a representation of the vocalized melody as a representation of the acquired audio data. The audio data may be acquired from a microphone operatively connected to the computing device, such as a built-in microphone or an external microphone, e.g., a headset, which is connected to the computing device.

According to a further embodiment of the invention, the representation of the melody generated by the user is acquired by acquiring nerve signals captured from a throat of the user subvocalizing the melody, and deriving a representation of the subvocalized melody as a representation of the nerve signals. The nerve signals are acquired from one or more electromyographical sensors which are operatively connected to the computing device via an interface. In this context, subvocalization is used for capturing a melody which the user is thinking of, or sings internally. As a person internally sings a melody, without vocalizing it audibly, they still make a variety of internal and external motions which are triggered by nerve signals controlling the muscles of the person. Both the nerve signals and the resulting motions, which typically are imperceptible to the human eye, are correlated with the melody and/or rhythm of the subvocalized music, and can be detected. These motions include muscle movements which are related to the ones the person would make to audibly create the sounds, such as the movement of vocal chords, and may also include associated movements the person would make, e.g., sway due to the music, modify breathing patterns, and so forth. Examples of these motions are motions of vocal chords, lips, tongue, jaw, neck, other body parts such as heads and shoulders, and motions related to breathing.

According to another embodiment of the invention, the representation of the melody generated by the user is acquired by acquiring a video sequence of the user subvocalizing the melody, magnifying motions of one or more body parts of the user, which motions are correlated with the subvocalized melody, and deriving a representation of the subvocalized melody as a representation of the magnified motions, e.g., using one or more metrics quantifying the motions of the lips, throat, or other body parts, of the user. The video sequence is acquired from a camera operatively connected to the computing device, e.g., a camera which is comprised in the computing device, such as a front-facing camera in a smartphone or tablet. Alternatively, an external camera, such as a web cam, may be connected to the computing device via an interface. The camera captures motions of one or more body parts of the user, such as the user's lips, throat, mouth, nose, face, neck, or shoulders, which motions are correlated with the subvocalized melody. The motions may, e.g., be magnified by means of Eulerian Video Magnification (EVM) or Lagrangian techniques which are described in further detail below. Acquiring the representation of the melody subvocalized by the user by means of a video capturing the user subvocalizing the melody, and processing the video to magnify motions which are correlated with the subvocalized melody, is an alternative to utilizing electromyographical sensors for capturing nerve signals.

Advantageously, embodiments of the invention which rely on authentication based on a melody subvocalized by the user enable a silent user authentication technique. Thereby, potential privacy issues are addressed where the entering of a password or audible exchange of information, such as audibly vocalizing a melody or a password, may present a risk.

In practice, a representation of a melody may, e.g., be an analog or digitized signal capturing a melody in the form of an audio signal (if the melody is vocalized or an original piece of music), motions of the user's body parts (if the melody is subvocalized and captured by means of video), or muscle activity of the user's body parts (if the melody is subvocalized and captured by means of electromyographical sensors).

According to an embodiment of the invention, the processing means is operative to determine that the acquired representation of the melody generated by the user and the representation of the reference melody fulfil a similarity condition by calculating a degree of similarity between the acquired representation of the melody generated by the user and the representation of the reference melody. Preferably, the two representations are of the same type, or at least compatible, so as to facilitate calculating a degree of similarity. The processing means is further operative to determine that the acquired representation of the melody generated by the user and the representation of the reference melody fulfil a similarity condition if the calculated degree of similarity exceeds a threshold value.

According to another embodiment of the invention, the processing means is operative to determine that the acquired representation of the melody generated by the user and the representation of the reference melody fulfil a similarity condition by deriving a melody signature from the acquired representation of the melody generated by the user, and calculating a degree of similarity between the melody signature derived from the melody generated by the user and a melody signature derived from the representation of the reference melody. This is particularly advantageous if the two representations are of different types and cannot be directly compared, e.g., if the melody generated by the user is subvocalized, and a representation of motions of the user's body parts, or nerve signals, are compared to a recorded original song. The melody signature may, e.g., be obtained based on a hashed time-frequency constellation analysis of a melody, aka as a "fingerprint" of a song, or by categorizing the pitch sequence of a melody in terms of pitch contours, as is explained in further detail below. The processing mans is further operative to determine that the acquired representation of the melody generated by the user and the representation of the reference melody fulfil a similarity condition if the calculated degree of similarity exceeds a threshold value.

The threshold values used in evaluating the similarity condition may, e.g., be generic threshold values which may be set by the user of the computing device, a manufacturer of the computing device, or by a provider of a software or a service relying on the authentication. Optionally, the threshold values may depend on a required level of security associated with the authentication, where a higher value of similarity is required for an increased level of security. For instance, a company may require a higher level of security for computing devices which is used by its employees, whereas a privately used device may be configured with a threshold level corresponding to a lower security level.

According to an embodiment of the invention, the representation of the reference melody is a previously acquired representation of the reference melody generated by the user. That is, the reference melody is recorded by the user for the purpose of authentication. This is similar to setting a conventional password or PIN code, which is typically done during configuring a computing device, such as a smartphone, before first use, or when enrolling for a service provided over the Internet, such as online banking or a music streaming service.

According to another embodiment of the invention, the reference melody is a piece of original music, i.e., a recoding, stored or retrieved in a digital format, of a melody or song. The reference melody may, e.g., be stored on the computing device as part of a music collection, or alternatively be part of a playlist. In the latter case, the reference melody may be retrieved, i.e., downloaded or streamed, by the computing device either prior to or during an authentication attempt.

According to an embodiment of the invention, the computing device further comprises a user-interface, e.g., a display, a loudspeaker, or an interface for a headset or earphones. The processing means is further operative to select the reference melody from a list comprising a plurality of melodies, such as a music collection, a playlist, or a list of reference melodies which is maintained for the purpose of authentication. In addition, the processing means is operative to request the user to generate the selected reference melody. The user is requested to generate the selected reference melody through the user-interface. This may, e.g., be achieved by audibly rendering at least a part of the selected reference melody, or by visually or audibly rendering a name of, or a clue pertaining to, the selected reference melody, through the user interface. For instance, if the reference melody is an original piece of music, i.e., a song, a part of the piece of music, e.g., the first few bars or seconds, may be played to the user as a challenge. Alternatively, the name or title of the selected reference melody may be rendered, either audibly by means of speech synthesis, or visually, as a message displayed on a display, e.g., a touchscreen comprised in the computing device. As a further alternative, rather than providing the user with the selected reference melody or its name or title, a clue may be presented to the user as a challenge to which the user responds by generating the melody. The clue may, e.g., be a picture which the user associates with the melody, such as a picture showing the members of a band performing the song. Alternatively, the clue may be displayed as a text message, such as "Anna's favorite song", where Anna is a person known to the user.

According to an embodiment of the invention, the reference melody may be selected from a list comprising a plurality of melodies, such as a music collection, a playlist, or a dedicated list of reference melodies, based on any one, or a combination of, one or more metrics. These metrics may, e.g., pertain to a user ranking of the melodies, a popularity of the melodies, a familiarity of the user with the melodies, a rate of successful previous authentication attempts with the melodies, a duration of time since the last time the user has listened to the melodies, or a duration of time since the last successful authentication attempt with the melodies. This is advantageous in that the reference melody may be selected so as to better match the user's preference for certain melodies or songs. For instance, melodies which the user is more likely to remember, or generate with a sufficient accuracy, may be preferred, so as increase the likelihood of a successful authentication attempt.

According to an embodiment of the invention, a melody may be removed from, or added to, such a list based on any one, or a combination of, the one or more metrics listed hereinbefore. This is advantageous in that the set of melodies from which a reference melody is selected for authentication comprises melodies which better match the user's preference for certain melodies or songs. For instance, melodies which the user is more likely to remember, or generate with a sufficient accuracy, may be preferred, so as increase the likelihood of a successful authentication attempt.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which:

FIG. 6 illustrates a melody and its corresponding sequence of pitch contours, in accordance with embodiments of the invention.

FIG. 7 exemplifies characterizing pitch contours, in accordance with embodiments of the invention.

All the figures are schematic, not necessarily to scale, and generally only show parts which are necessary in order to elucidate the invention, wherein other parts may be omitted or merely suggested.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1:
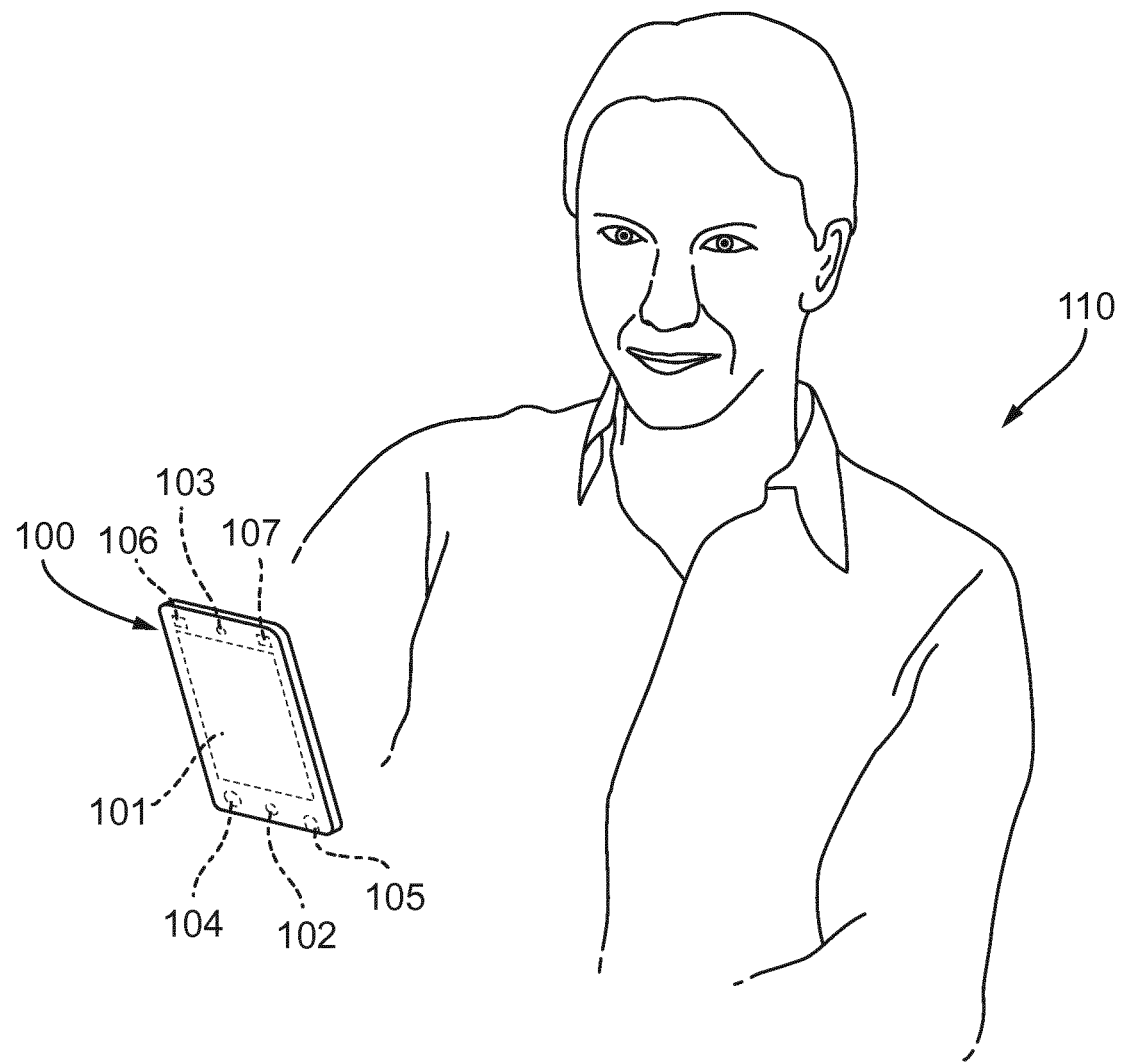
FIG. 1 shows a computing device for authenticating a user based on a melody audibly generated by the user, in accordance with an embodiment of the invention.

In FIG. 1, an embodiment 100 of the computing device for authenticating a user 110 of computing device 100 is shown. More specifically, computing device 100 is operative to authenticate user 110 based on a melody which is audibly generated by user 110, e.g., by singing, humming, or whistling. Computing device 100 is in FIG. 1 illustrated as a mobile phone, or smartphone, comprising a display 101, such as a touchscreen, a microphone 102, a front-facing camera 103, i.e., a camera which is provided on the same face as display 101, a loudspeaker 104, and an interface 105 for connecting external devices such as a headset or headphones, processing means 106, and a communication module 107.

Interface 105 is in FIG. 1 illustrated as a conventional headphone jack, but may alternatively be embodiment as any other type of connector, such as a Lightning connector, a Universal Serial Bus (USB) connector, or the like. As yet a further alternative, interface 105 may also be a wireless interface based on technologies like coded visible or invisible light, Bluetooth, or ZigBee.

Communication module 107 is operative to effect wireless communications with a Radio Access Network (RAN) or with another computing device, based on a cellular telecommunications technique such as the Global System for Mobile communications (GSM), Universal Mobile Telecommunications System (UMTS), Long Term Evolution (LTE), or any 5G standard. Alternatively, or additionally, communication module 107 may be operative to effect wireless communications through a Wireless Local Arena Network (WLAN)/Wi-Fi network.

Processing means 106 is operative to acquire a representation of a melody generated by user 110, and authenticate user 110 in response to determining that the acquired representation of the melody generated by user 110 and a representation of a reference melody fulfil a similarity condition. More specifically, processing means 106 is operative to acquire the representation of the melody by acquiring, from microphone 102 or any other microphone operatively connected to the computing device, such as an external microphone or a headset, audio data of user 110 vocalizing the melody. This may be achieved by capturing the electrical signals generated by microphone 102 or an external microphone, and digitizing the captured electrical signals for subsequent processing, similar to what is known in the field of voice/speech recognition. Processing means 106 is further operative to derive a representation of the vocalized melody as a representation of the acquired audio data, e.g., in a format suitable for storing audio data, such as MP3, WAV, PCM, ALAC, AAC, or the like. Alternatively, the representation of the vocalized melody may be derived as a signature, aka "fingerprint", based on a frequency spectrum or a hashed time-frequency constellation analysis similar to what is used by services like Shazam (see, e.g., "An Industrial-Strength Audio Search Algorithm", by A. L.-C. Wang, Proceedings of the 4th International Conference on Music Information Retrieval, 2003).

It will be appreciated that processing means 106 is operative to determine that the acquired representation of the melody generated by user 110 and a representation of a reference melody fulfil a similarity condition based on a confidence score, or degree of similarity, rather than an absolute comparison. This is the case since user 110 may not be able to reproduce a previously recorded reference melody completely accurate, or to generate a melody in exactly the same way as it is present in a piece of recorded music which is used a reference melody. To this end, processing means 106 is operative to determine that the similarity condition is fulfilled if the user-generated melody and the reference melody are in agreement to sufficient extent, which may be implemented by comparison with a threshold value. Such threshold value may, e.g., specify a number or fraction of common characteristic features, such as contour pitches which can be identified in both the user-generated melody and the reference melody. Alternatively, the threshold value may relate to a value calculated by means of a correlation function which is applied to the representation of the user-generated melody and the representation of the reference melody.

Figure 2:
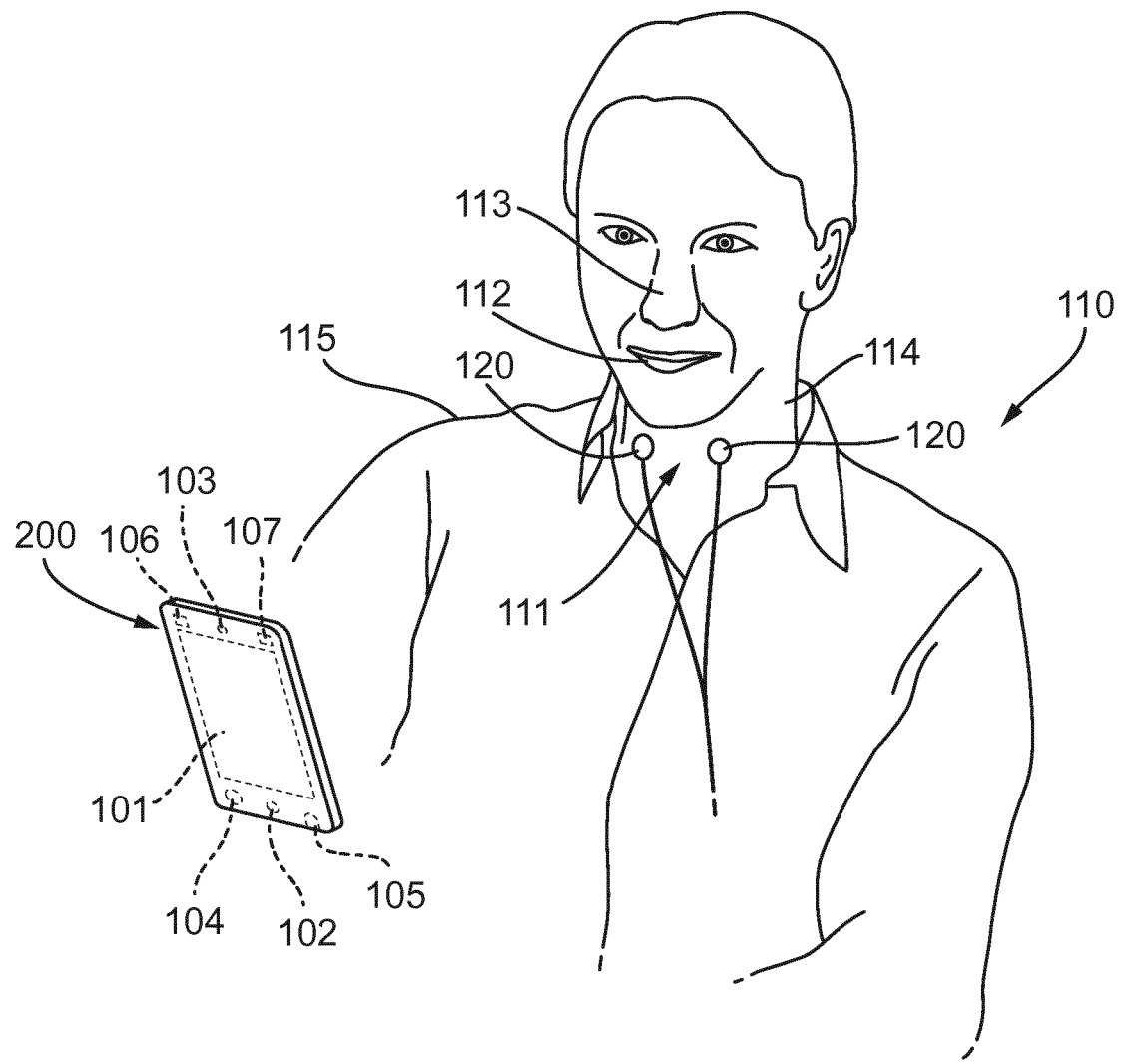
FIG. 2 shows a computing device for authenticating a user based on a melody subvocalized by the user, in accordance with another embodiment of the invention.

In FIG. 2, another embodiment 200 of the computing device for authenticating a user 110 of computing device 200 is shown. Computing device 200 is similar to computing device 100 described with reference to FIG. 1, and is illustrated as a mobile phone, or smartphone, comprising display 101, microphone 102, front-facing camera 103, loudspeaker 104, and interface 105 for connecting external devices, processing means 106, and communication module 107.

In contrast to computing device 100, computing device 200 is operative to authenticate user 110 based on a melody which is subvocalized by user 110, i.e., which is non-audible or hardly audible for bystanders. To this end, subvocalization is used for identifying a melody which user 110 is thinking of, or singing internally. As a person internally sings a melody, although they do not make audible noise, they still make a variety of internal (e.g., vocal chords) and external (e.g., lips) motions which can be detected, albeit being imperceptible to the human eye. These motions include muscle movements which are related to the ones the person typically would make to create audible sounds, e.g., movement of vocal chords, and may also include associated movements the person would make, e.g., sway due to the music, modify breathing patterns, and so forth. To give some examples, these motions include motions of vocal chords, lips or mouth, tongue, jaw, head, shoulders, neck, and chest. These motions are correlated with the melody subvocalized by user 110, and/or the rhythm thereof. As an example, user 110 may subvocalize the song "Happy Birthday" by replacing the words with "da's", resulting in "da-da-daar-daar-daar-daaar". As user 110 subvocalizes, the following motions are typically made:

For each "da" or "daar" the user's vocal chords will move, albeit with small magnitude. User 110 may also move their lips 112, tongue or jaw, similarly to if making audible noises, but with smaller magnitude.

User 110 may also "sway" to the music, which could cause small movements in the head or shoulders 115.

User 110 may make head movements when thinking of the pitch of the music, for example lifting the head up for higher notes, and down for lower notes.

User 110 may co-ordinate breathing with the music, e.g., by breathing at the same time as if audibly vocalizing the melody, which is synchronized to the "phrasing" of the music. This may result in movements of nose 113, shoulders 115, or the chest.

To this end, processing means 106 is operative to acquire, from one or more electromyographical sensors 120 which are operatively connected to computing device 200, nerve signals which are captured from a throat 111 of user 110 subvocalizing the melody. Electromyographical sensors 120 are preferably attached to throat 111 of user 110, e.g., one sensor 120 one each side of the larynx. The nerve signals which can be captured by means of sensors 120 are correlated with the melody user 110 subvocalizes, i.e., sings internally, since they control movements of the larynx and other body parts of user 110. Sensors 120 may, e.g., be connected to computing device 200 via an interface, such as interface 105, which may either receive the sensor signal directly, e.g., as analog electric signal, as a digitized representation of the analog sensor signal, or as a chunk of data captured by sensors 120 and delivered to computing device 200, optionally after pre-processing, either wired or wirelessly.

Processing means 106 is further operative to derive a representation of the subvocalized melody as a representation of the nerve signals. The representation may, e.g., be derived as a signature or fingerprint representing characteristic features of the captured nerve signals, by means of a frequency spectrum, as a hashed time-frequency constellation analysis similar to what is described hereinbefore, or the like. It is noted here that research has shown that a limited vocabulary of words can be detected using electromyographical techniques (see, e.g., "Subvocal Speech Recognition System based on EMG Signals", by Y. Bandi, R. Sangani, A. Shah, A. Pandey, and A. Varia, International Conference on Computer Technology (ICCT 2015), International Journal of Computer Applications (0975-8887), pages 31-35, 2015; US 2006/0129394 A1; and US 2007/0106501 A1).

Figure 3:
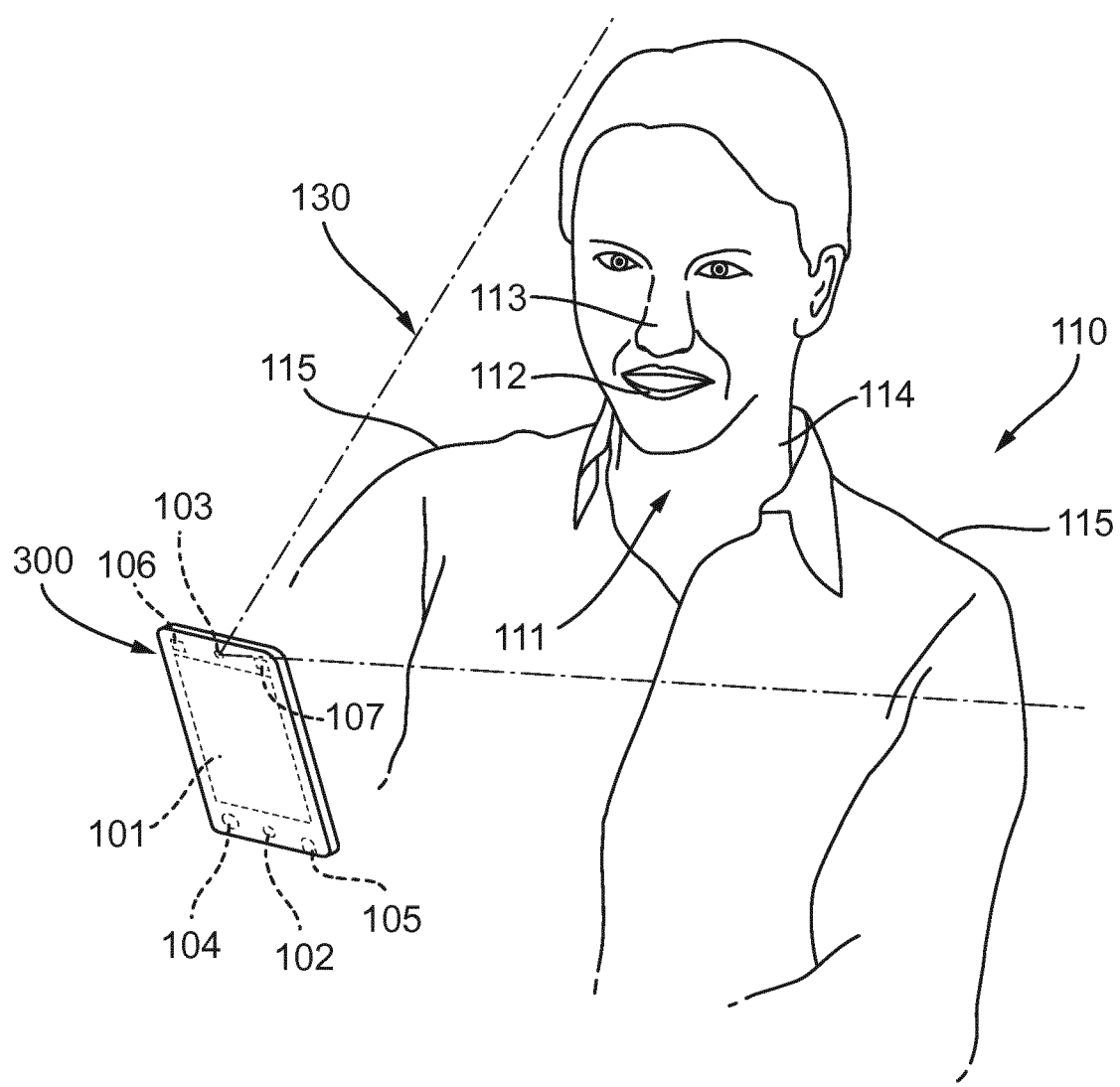
FIG. 3 shows a computing device for authenticating a user based on a melody subvocalized by the user, in accordance with a further embodiment of the invention.

In FIG. 3, yet another embodiment 300 of the computing device for authenticating a user 110 of computing device 300 is shown. Computing device 300 is similar to computing devices 100 and 200 described with reference to FIGS. 1 and 2, respectively, and is illustrated as a mobile phone, or smartphone, comprising display 101, microphone 102, front-facing camera 103, loudspeaker 104, interface 105 for connecting external devices, processing means 106, and communication module 107.

Figure 4:
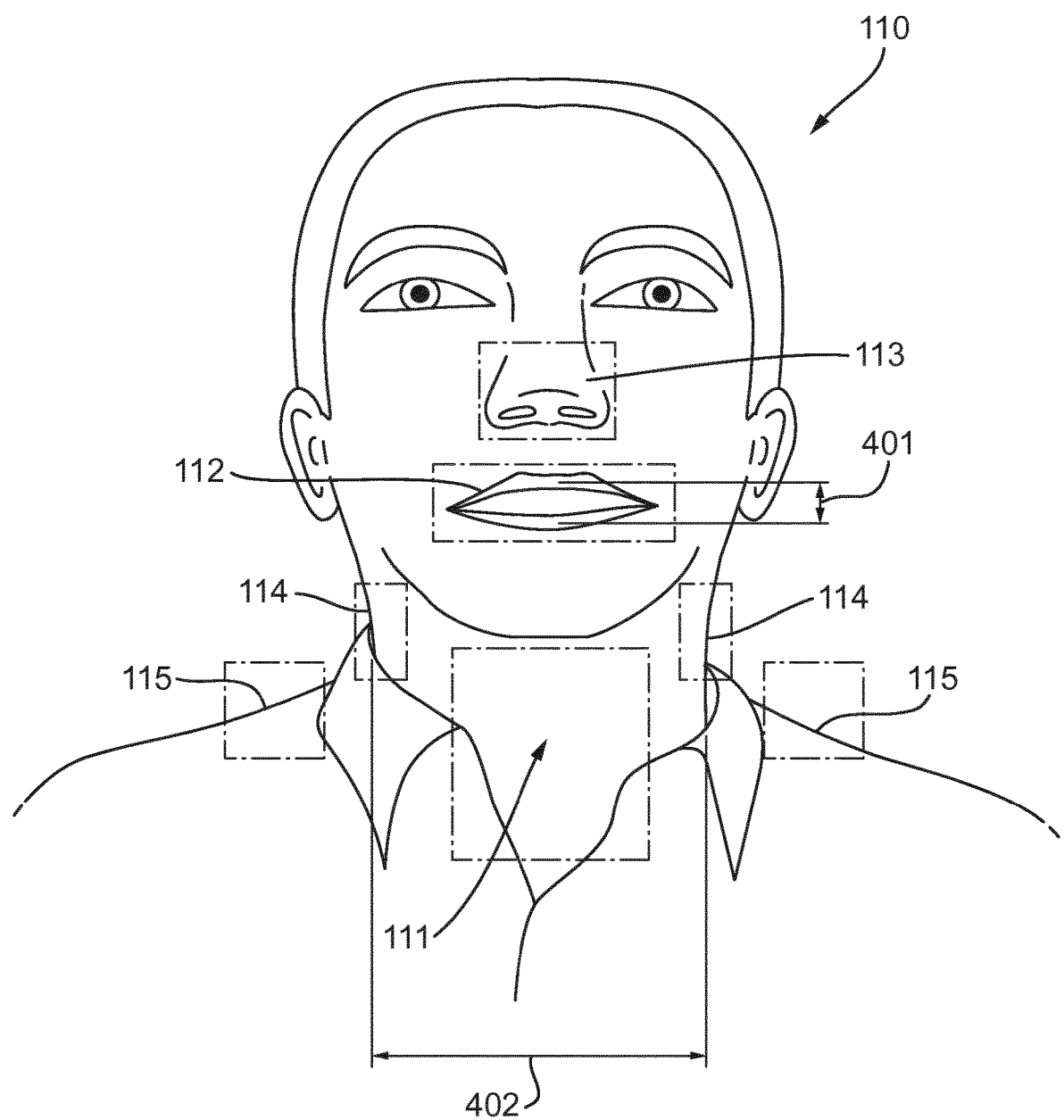
FIG. 4 exemplifies an image of a video sequence captured by a camera comprised in the embodiment of the computing device shown in FIG. 3.

Similar to computing device 200, computing device 300 is operative to authenticate user 110 based on a melody which is subvocalized by user 110, i.e., which is non-audible or hardly audible for bystanders. To this end, processing means 106 is operative to acquire the representation of the melody generated by user 110 by acquiring a video sequence of user 110 subvocalizing the melody, and magnifying motions of one or more body parts 111-115 of user 110, which motions are correlated with the subvocalized melody. The video sequence is acquired from a camera operatively connected to the computing device, such as front-facing camera 103 or an external camera operatively connected to computing device 300, e.g., a web cam or a camera mounted in a computer display, having a field-of-view so as to capture at least one of the user's 110 face, throat 111, mouth or lips 112, nose 113, neck 114, and shoulders 115. Typically, body parts 111-115 are subject to motions which are imperceptible to the human eye when user 110 subvocalizes the melody. An example of an image 400 of a video sequence captured by camera 103 is illustrated in FIG. 4.

Processing means 106 is operative to magnify these motions by video processing the acquired video sequence based on EVM or Lagrangian techniques. EVM is an image processing technique which applies a spatial decomposition followed by a temporal filter to the frames of a standard video in order to amplify very small motions which are present but typically are imperceptible to the human eye. The technique can be applied in real-time to highlight events occurring at specified temporal frequencies. For a description of EVM, see, e.g., "Eulerian Video Magnification for Revealing Subtle Changes in the World", by H.-Y. Wu, M. Rubinstein, E. Shih, J. Guttaggs, ACM Transactions on Graphics, vol. 32, article no. 80, ACM New York, 2013), and it was concluded that the Eulerian approach, i.e., EVM, supports larger amplification factors at better noise performance. Whereas the Lagrangian approaches estimate the motions explicitly (so the motions themselves are amplified), EVM relies on calculating and amplifying the non-motion compensated frame differences. A solution for coping with large motions in the Lagrangian approach is reported in "Video magnification in presence of large motions" (by M. A. Elgharib, M. Hefeeda, F. Durand, and W.

T. Freeman, 2015 IEEE Conference on Computer Vision and Pattern Recognition (CVPR), pages 4119-4127, IEEE Computer Society, 2015), and is based on defining a Region-of-Interest (ROI) within which motions are magnified.

Processing means 106 is further operative to derive a representation of the subvocalized melody as a representation of the magnified motions. For instance, the representation may be based on one or more metrics which quantify the motions of lips 112, neck 114, or other body parts, of user 110. In practice, if lips 112 are captured in the video sequence obtained from camera 103, the representation may be based on a measured distance 401, magnified by video processing, between the upper and lower lip 112 over time. As an alternative, the representation may be based on a measured width 402, magnified by video processing, of neck 114 over time.

Figure 5:
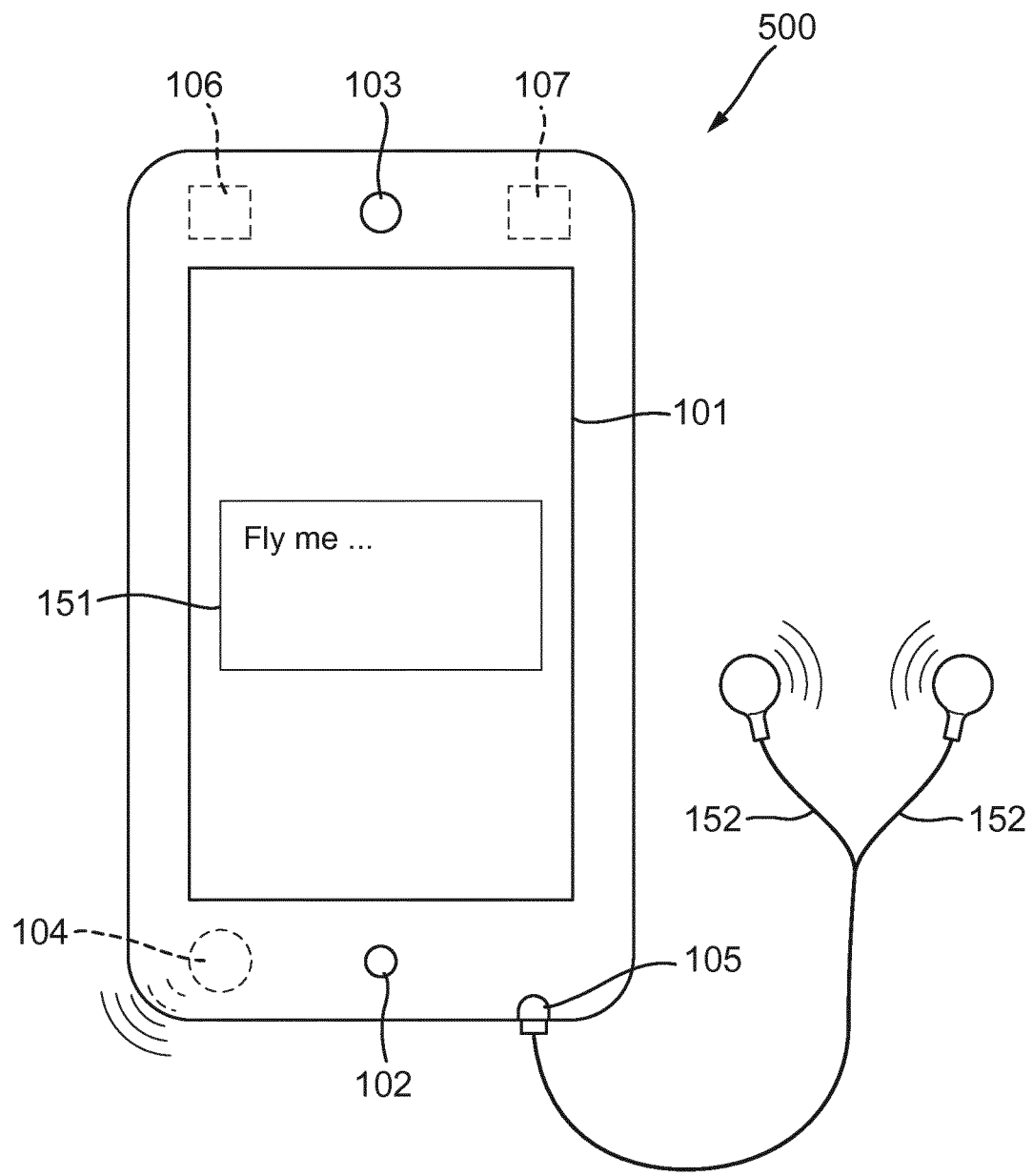
FIG. 5 shows a computing device for authenticating a user, in accordance with embodiments of the invention.

In FIG. 5, another embodiment 500 of the computing device for authenticating a user of computing device 500 is shown. Computing device 500 is similar to computing devices 100, 200, and 300, described with reference to FIGS. 1 to 3, respectively, and is illustrated as a mobile phone, or smartphone, comprising display 101, microphone 102, front-facing camera 103, loudspeaker 104, interface 105 for connecting external devices, processing means 106, and communication module 107.

In addition to what is described hereinbefore with reference to computing devices 100, 200, and 300, processing means 106 is further operative to select the reference melody from a list comprising a plurality of melodies, and request user 110, through a user-interface comprised in computing device 500, to generate the selected reference melody. User 110 may, e.g., be requested to generate the selected reference melody by rendering, through the user-interface, any one of a name or title of the selected reference melody and a clue pertaining to the selected reference melody. For instance, the request may either be rendered visually, by displaying a message 151, comprising the name or title of the reference melody, or an image, on display 101 or an external display which is operatively connected to computing device 500. Alternatively, the request may be rendered audibly, using speech synthesis for rendering the name or title of the selected reference melody, or by playing a portion of the selected reference melody (e.g., the first few bars or seconds from an original piece of music) through loudspeaker 104 or headphones 152 connected to computing device 500. Alternatively, rather than providing the user with a name or title of the selected challenge melody, an image which the user associates with the melody may be displayed, e.g., an image showing the members of a band or the cover or a record. As a further alternatively, a clue may also be displayed as a text message 151, e.g., "Fly me . . . " as a clue to the reference melody "Fly me to the moon", or "Anna's favorite song", where Anna is a person known to user 110.

Further with reference to what is described hereinbefore, an embodiment of the computing device, such as computing devices 100, 200, 300, or 500, may further maintain a list comprising a plurality of melodies which may be used as reference melodies for authentication purposes. This list may, e.g., be a collection of melodies or songs stored in a memory of the computing device, such as a music collection, or a playlist of songs provided by a music streaming service. As yet a further alternative, the list may also be a dedicated list which is solely used for authentication. The melodies or songs which are comprised in the list may be pieces of original music or melodies which are recorded by the user of the computing device. Accordingly, the representation of the reference melody which is used in determining whether the similarity condition is fulfilled may be a previously acquired representation of the reference melody generated by the user. That is, the user generates and records, or captures, a subvocalized melody which he/she wants to use for authentication. This is similar to setting a PIN code in a conventional password-based authentication scheme. As an alternative, the reference melody may be a piece of original music, i.e., music recorded by a band, rather than generated by the user.

Processing means 106 may further be operative to select the reference melody from the list comprising a plurality of melodies based one any one, or a combination of one or more metrics. These metrics may, e.g., pertain to a user ranking of the melodies. For instance, the user may rank melodies which are used for authentication as favorable or less-favorable. Alternatively, rankings which the user makes for songs he/she listens to may be used. In that way, melodies which are favored by the user may be preferred, and the likelihood of successful authentication is thereby increased. The metrics may also pertain to a popularity of the melodies. For instance, melodies which are frequently broadcasted by radio stations, included in play lists of music streaming services, listed as frequently downloaded/ streamed by music streaming services or online music stores, or which are contained in music charts (such as Billboard), may be preferred. The metrics may also pertain to a familiarity of the user with the melodies. For instance, a melody which the user frequently hums, or sings-along when listening to the melody, may be preferred. The metrics may also pertain to a rate of successful previous authentication attempts with the melodies, wherein melodies which have worked well during previous authentication attempts may be preferred. The metrics may also pertain to a duration of time since the last time the user has listened to the melodies and/or a duration of time since the last successful authentication attempt with the melodies. Since it may be easier for the user to associate the melody, if a clue is used, and to subvocalize the melody successfully if he/she has recently listened to the melody, it is preferable to select a melody which the user has recently listened to, or a melody which has recently been used in a successful authentication attempt. Processing means 106 may even further be operative to remove a melody from, or add a melody to, the list comprising a plurality of melodies based one any one, or a combination of one or more of these metrics.

In the following, different ways of determining that the acquired representation of the melody generated by user 110 and the representation of the reference melody fulfil a similarity condition are described, in accordance with embodiments of the invention.

For instance, processing means 106 may be operative to determine that the acquired representation of the melody generated by user 110 and the representation of the reference melody fulfil a similarity condition by calculating a degree of similarity between the acquired representation of the melody generated by user 110 and the representation of the reference melody. In practice, this is advantageous if two the representations are of the same type, or at least compatible, e.g., if the representation of a subvocalized melody is compared to a representation of a previously subvocalized and stored reference melody. This may, e.g., be achieved by calculating a correlation function, in particular a cross-correlation function, between the two representations. As is known in the art, a correlation function is a function that gives the statistical correlation between random variables. Correlation functions of different random variables are called cross-correlation functions. For instance, this may be the case if a representation of a melody generated by user 110 during an authentication attempt is compared to a reference melody previously generated, and stored, by user 110. In such case, two different sets of audio data, nerve signals, or video sequences are compared, depending on whether the melody is vocalized and captured by microphone 102, subvocalized and captured by sensors 120, or subvocalized and captured by camera 103, respectively. Processing means 106 is further operative to determine that the acquired representation of the melody generated by user 110 and the representation of the reference melody fulfil a similarity condition if the calculated degree of similarity exceeds a threshold value. This may, e.g., be a generic threshold value, e.g., set by the manufacturer of the computing device, or set by a provider of a software or a service relying on the authentication. Optionally, the similarity threshold value may depend on a required level of security, e.g., a higher threshold may be set for an increased security level. The degree of similarity may optionally be defined so as be confined to a certain range. As an example, one may define the degree of similarity such that a value of zero indicates that the two representations are complete dissimilar, whereas a value of one indicates that the two representations are in perfect agreement.

According to another embodiment of the invention, processing means 106 is operative to determine that the acquired representation of the melody generated by user 110 and the representation of the reference melody fulfil a similarity condition by deriving a melody signature from the acquired representation of the melody generated by user 110, and calculating a degree of similarity between the melody signature derived from the melody generated by user 110 and a melody signature derived from the representation of the reference melody. Similar to what is described hereinbefore, processing means 106 is further operative to determine that the acquired representation of the melody generated by user 110 and the representation of the reference melody fulfil a similarity condition if the calculated degree of similarity exceeds a threshold value. Deriving a melody signature and calculating a degree of similarity based on the derived melody signatures is particularly advantageous if the representation of the melody generated by user 110 and the representation of the reference melody are of different type, e.g., if the subvocalized melody is compared to an original song.

The melody signature may be derived in a number of ways. For instance, the melody signature may be derived as a signature, aka "fingerprint", based on a hashed time-frequency constellation analysis similar to what is used by services like Shazam (see, e.g., "An Industrial-Strength Audio Search Algorithm", by A. L.-C. Wang, Proceedings of the 4th International Conference on Music Information Retrieval, 2003), or as any other type of frequency-spectrum analysis.

As an alternative to utilizing a statistical approach, a melody may be extracted algorithmically, either from a representation of the user-generated melody or from a representation of the reference melody. Generally, it is first determined whether a melody is present or not. For example, if a song contains a section with only a regular drum beat playing, this is unlikely to be the part which people would chose to hum. On the other hand, sections of a song where a lead vocalist is singing are far more likely to contain what people are likely to consider to be a melody. Then, the melody is analyzed by identifying pitch contours and forming a melody pitch sequence, i.e., a sequence of pitch contours.

The process of forming a sequence 620 of pitch contours from a melody 610 is sketched in FIG. 6, using the song "Fly me to the moon" as an example. In the present context, the pitch contour of a sound is a function or curve that tracks the perceived pitch of the sound over time. The obtained sequence of pitch contours can subsequently be analyzed and transformed into a representation which is suitable for comparison. This may, e.g., be achieved by utilizing an approach similar to what is disclosed in "Melody extraction from polyphonic music signals using pitch contour characteristics", by J. Salamon and E. Gómez, IEEE Transactions on Audio, Speech, and Language Processing, vol. 20, pages 1759-1770, 2012, and typically involves the steps of sinusoidal extraction, salience function computation, creation of pitch contours, and pitch contour characterization. Reference is also made to "Statistical characterisation of melodic pitch contours and its application for melody extraction", by J. Salamon, G. Peeters, and A. Röbel, 13th International Society for Music Information Retrieval Conference (ISMIR 2012), 2012.

Based on the obtained melody pitch sequence, such as sequence 620 of pitch contours in FIG. 6, various data may can be extracted which can be used as a basic for comparing melodies, or their respective representations. For instance, melody pitch sequence 620 may be characterized based on any one, or a combination of, a respective duration 631 of pitch contours, a distance (in time) 632 between disconnected pitch contours, a duration between adjacent pitch inflections, a number of pitch inflections within a continuous pitch contour, or a direction of change 633 between disconnected pitch contours. More specifically, for each pair of adjacent pitch contours in sequence 620, the direction of change 633 may be characterized as being one of: constant or no change in pitch ("C" or "0"), an increase in pitch ("|" or "+"), or a decrease in pitch ("D" or "−"). As an example, melody pitch sequence 620 sketched in FIG. 6 may be characterized as DD|||DDD.

In addition, or alternatively, one may also characterize each disconnected pitch contour in terms of their behavior over the duration of each contour, e.g., following the characteristic forms shown in FIG. 7. That is, a melody, or rather the melody pitch sequence extracted from the melody, is characterized as a sequence of any one of: rising, rising-flat, rising-falling, flat-rising, flat, flat-falling, falling-rising, falling-flat, and falling.

In addition, the beat of a melody may also be taken into consideration when deriving a melody signature. Typically, the melody will follow the beat, i.e., pitch contours are likely to start/inflect/finish in uniform time periods.

It will also be appreciated that, when vocalizing melodies, user 110 may use a breathing pattern which is synchronized with the phrasing of the melody, and these patterns may be carried over into subvocalization. Accordingly, data representing a breathing pattern, e.g., a metric derived from a width 402 or neck 114, as is illustrated in FIG. 4, may also be taken into consideration when deriving a melody signature.

To this end, by deriving a melody signature, a number of characteristic data points are created which reflect changes in note, and optionally the beat of the melody and how the melody was produced (i.e., breathing patterns). Note that the approach described herein does not rely on specific notes, i.e., the exact frequency is not measured. Rather the beginning, end, and inflection, of notes or a sequence of notes, which are detected as pitch contour, is considered. Hence, user 110 does not necessarily need to be "in tune", or the motions causing the noise would not need to be at a certain frequency, but it is rather relative changes which are used.

If user 110 generates the melody subvocally, no audible melody or music is generated which can be captured for later storing and processing. In particular, a melody pitch sequence cannot be derived in a way similar as is described above. Rather, embodiments of the invention relying on a melody which is subvocalized by user 110, such as described with reference to FIGS. 2 to 4, rely on an algorithm for deriving a melody signature from nerve signals captured from sensors 120, or from a video sequence captured by camera 103, or an external camera.

As discussed hereinbefore, the humming, singing, or whistling, of a melody is correlated with various movements of body parts of user 110, both the melody and the beat of the music. In particular, muscle movements are typically correlated with a change in pitch, since the vocal chords assume a different position. In addition, a person subvocalizing a melody tends to make motions such as if they were making the noises, e.g., leaning forward when creating low notes, leaning back when creating high notes (as could be seen in the shoulders and head). Also the diaphragm assumes different positions when creating low and high notes, respectively.

Other movements may be also correlated with the phrasing and/or the rhythm of the music. For instance, people may breathe in the pauses of the melody or sway in time with the music, as if they were vocalizing the melody.

Hence by monitoring the nerve signals which control the movement of body parts of user 110, using sensors 120, or by capturing a video sequence of the body parts of user 110, such as throat 111, lips/mouth 112, nose 113, neck 114, or shoulders 115, a melody signature, or a set of melody signature data, can be derived which may be used for comparing the representation of the user-generated melody with the representation of the reference melody.

For instance, a melody signature can be extracted for a melody subvocalized by user 110 as follows. First, a video sequence capturing user's 110 upper body, or at least one or more of user's 110 throat 111, lips/mouth 112, nose 113, neck 114, and shoulders 115, is acquired. Subsequently, one or more of user's 110 body parts are identified by means of object recognition. Then, one or more body parts of user 110 are tracked throughout the video sequence and their motion is derived as a time series. As an example, with reference to FIG. 4, embodiments of the invention may track lips/mouth 112 and extract a time series of the distance 401 between the upper lip and the lower lip, or a time series of the width 402 of user's 110 neck 114. From these time series, a melody signature may be extracted similar to what has been discussed above with reference to deriving a sequence of pitch contours. Alternatively, the time series may be analyzed in terms of frequency, direction/change of motion, magnitude of motion, and the like.

As a further example, if a video sequence of throat 111 is acquired, a sequence of pitch contours may be derived based on the observation that user's 110 vocal chords will change shape at the time of pitch changes (as the vocal chords are moved apart), and also at the initiation and cessation of a pitch contour. Thereby, the start and end of pitch contours can be identified, as well as any pitch inflections (with pitch inflections being differentiated from the start/end of pitch contours as the vocal chords do not return to the relaxed state. In addition, the motion of user's 110 vocal chords may also determine the direction of pitch change (e.g., from a higher to a lower note) by assessing motion caused by the vocal chords.

As a further example, user's 110 shoulders 115, or head, may move in time with the music. Hence, the number of pitch contours per unit of time, e.g., per beat of music, may be calculated and used for the purpose of calculating a degree of similarity.

It will be appreciated that embodiments of the computing device for authenticating a user of the computing device may comprise only some of the parts described with reference to FIGS. 1 to 5, whereas other parts may be optional. Moreover, whereas embodiments 100, 200, 300, and 500, of the computing device are throughout the figures illustrated as mobile phones, or smartphones, it will be appreciated that embodiments of the invention which are based on mobile terminals, tablets, personal computers, computer displays, televisions, media players, laptops, and the like, may easily be envisaged.

In the following, embodiments of processing means 106, comprised in an embodiment 100, 200, 300, or 500, of the computing device, are described with reference to FIGS. 8 and 9.

Figure 8:
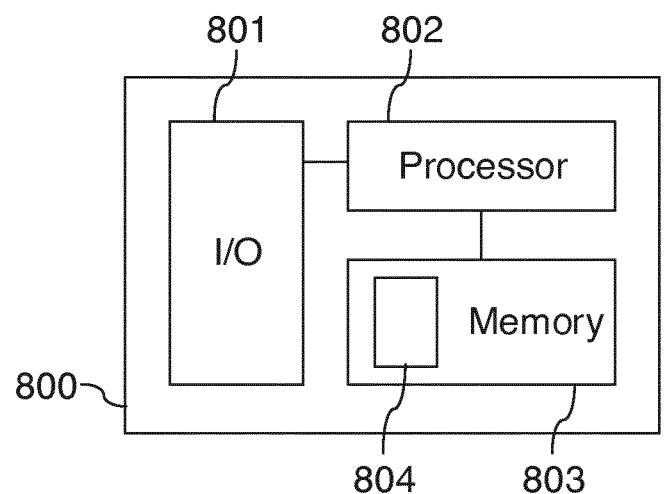
FIG. 8 shows an embodiment of the processing means comprised in the computing device for authenticating a user.

In FIG. 8, a first embodiment 800 of processing means 106 is shown. Processing means 800 comprises a processing unit 802, such as a general purpose processor, and a computer-readable storage medium 803, such as a Random Access Memory (RAM), a Flash memory, or the like. In addition, processing means 800 comprises one or more interfaces 801 ('I/O' in FIG. 8) for controlling and/or receiving information from other components comprised in the computing device, such as display 101, microphone 102, camera 103, loudspeaker 104, connector 105, and communication module 107. In particular, interface(s) 801 may be operative to acquire, from microphone 102 or an external microphone, audio data of user 110 vocalizing the melody. Alternatively, interface(s) 801 may be operative to acquire, from sensors 120, nerve signals captured from throat 111 of user 110 subvocalizing the melody. As yet a further alternative, interface(s) 801 may be operative to acquire, from camera 103 or an external camera, a video sequence of user 110 subvocalizing the melody. Memory 803 contains computer-executable instructions 804, i.e., a computer program, for causing the computing device to perform in accordance with embodiments of the invention as described herein, when computer-executable instructions 804 are executed on processing unit 802.

Figure 9:
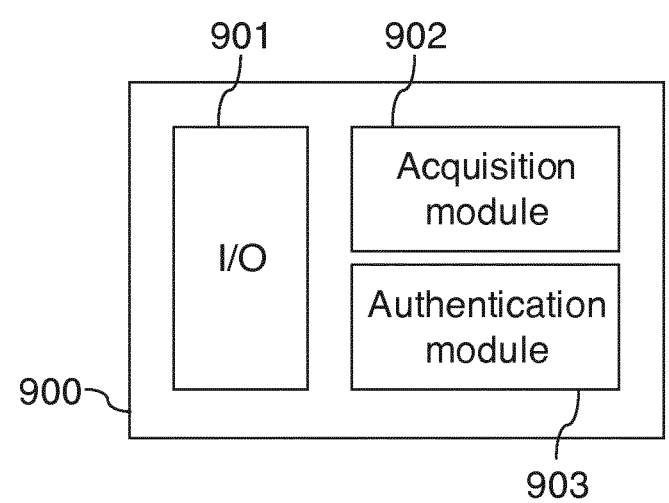
FIG. 9 shows another embodiment of the processing means comprised in the computing device for authenticating a user.

In FIG. 9, an alternative embodiment 900 of processing means 106 is illustrated. Similar to processing means 800, processing means 900 comprises one or more interfaces 901 ('I/O' in FIG. 9) for controlling and/or receiving information from other components comprised in the computing device, such as display 101, microphone 102, camera 103, loudspeaker 104, connector 105, and communication module 107. In particular, interface(s) 901 may be operative to acquire, from microphone 102 or an external microphone, audio data of user 110 vocalizing the melody. Alternatively, interface(s) 901 may be operative to acquire, from sensors 120, nerve signals captured from throat 111 of user 110 subvocalizing the melody. As yet a further alternative, interface(s) 901 may be operative to acquire, from camera 103 or an external camera, a video sequence of user 110 subvocalizing the melody. Processing means 900 further comprises an acquisition module 902 configured for acquiring a representation of a melody generated by user 110, and an authentication module 903 configured for authenticating user 110 in response to determining that the acquired representation of the melody generated by user 110 and a representation of a reference melody fulfil a similarity condition. Acquisition module 902 and authentication module 903 are configured for causing the computing device to perform in accordance with embodiments of the invention as described herein.

Interface(s) 801 and 901, and modules 902-903, as well as any additional modules comprised in processing means 900, may be implemented by any kind of electronic circuitry, e.g., any one, or a combination of, analogue electronic circuitry, digital electronic circuitry, and processing means executing a suitable computer program.

Figure 10:
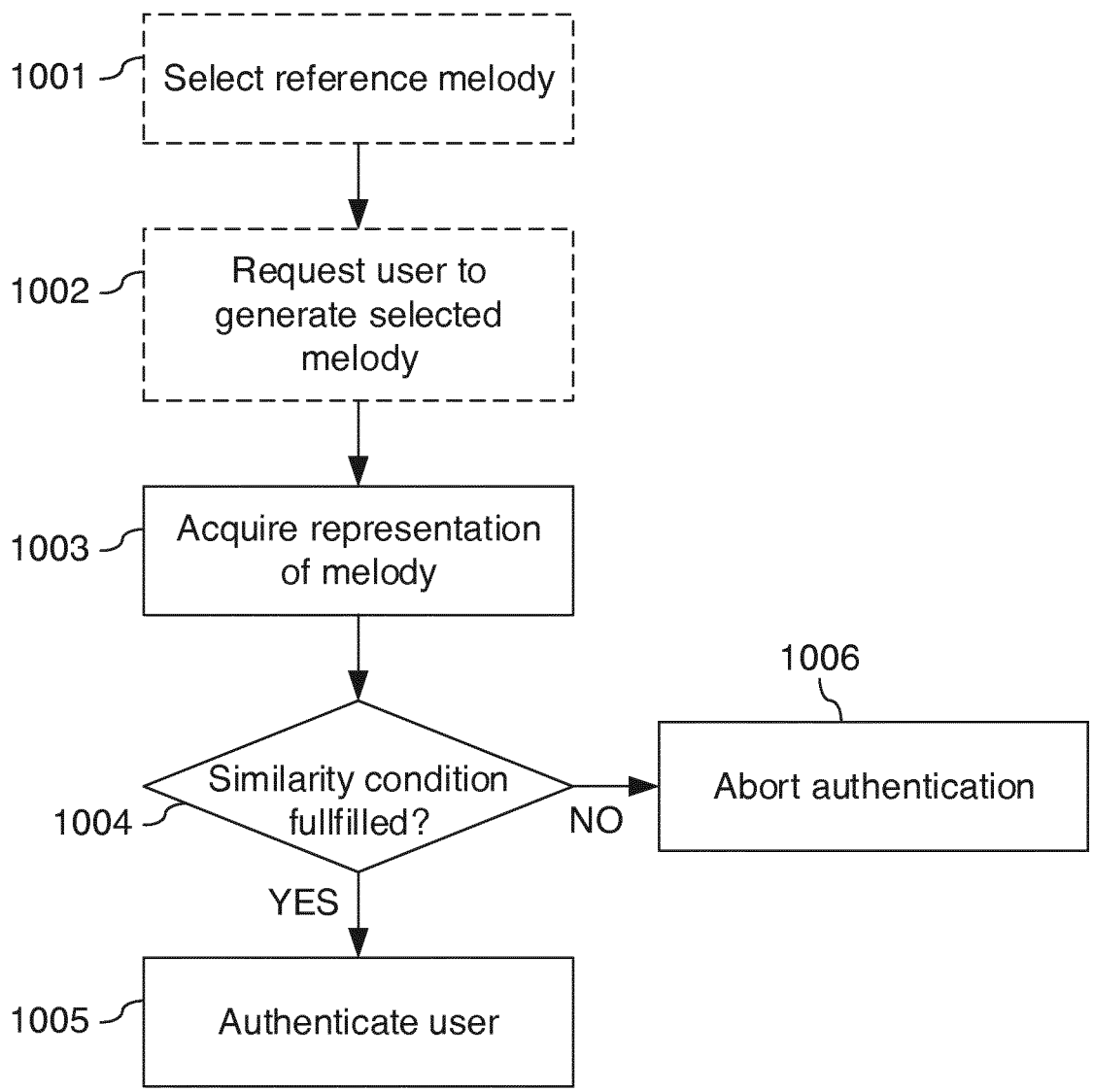
FIG. 10 shows a method of authenticating a user of a computing device, in accordance with embodiments of the invention.

In the following, embodiments 1000 of the method of authenticating a user 110 of a computing device are described with reference to FIG. 10, in accordance with embodiments of the invention. Method 1000 is performed by a computing device, such as a mobile phone, a mobile terminal, a smartphone, a tablet, a personal computer, a computer display, a television, a media player, or a laptop. User 110 may, e.g., be authenticated to access the computing device.

Method 1000 comprises acquiring 1003 a representation of a melody generated by user 110, and authenticating 1005 user 110 in response to determining 1004 that the acquired representation of the melody generated by user 110 and a representation of a reference melody fulfil a similarity condition. If it is determined 1004 that the similarity condition is not fulfilled, user 110 is not authenticated, i.e., authentication is denied or the authentication attempt is aborted 1006.

Acquiring 1003 the representation of the melody generated by user 110 may, e.g., comprise acquiring, from a microphone operatively connected to the computing device, audio data of user 110 vocalizing the melody, and deriving a representation of the vocalized melody as a representation of the acquired audio data. Alternatively, acquiring 1003 the representation of the melody generated by user 110 may comprise acquiring, from one or more sensors operatively connected to the computing device, nerve signals captured from a throat 110 of user 110 subvocalizing the melody, and deriving a representation of the subvocalized melody as a representation of the nerve signals. As yet a further alternative, acquiring 1003 the representation of the melody generated by user 110 may comprise acquiring, from a camera operatively connected to the computing device, a video sequence of user 110 subvocalizing the melody, magnifying, by video processing the acquired video sequence, motions of one or more body parts of user 110, which motions are correlated with the subvocalized melody, and deriving a representation of the subvocalized melody as a representation of the magnified motions.

The representation of the reference melody may, e.g., be a previously acquired representation of the reference melody generated by user 110. Alternatively, the reference melody may be piece of original music.

Method 1000 may further comprise selecting 1001 the reference melody from a list comprising a plurality of melodies, and requesting 1002 user 110, through a user-interface comprised in the computing device, to generate the selected reference melody. For instance, user 110 may be requested 1002 to generate the selected reference melody by rendering, through the user-interface, any one of a name of, and a clue pertaining to, the selected reference melody.

Optionally, the reference melody is selected 1001 from a list comprising a plurality of melodies based one any one, or a combination of one or more metrics pertaining to a user ranking of the melodies, a popularity of the melodies, a familiarity of user 110 with the melodies, a rate of successful previous authentication attempts with the melodies, a duration of time since the last time user 110 has listened to the melodies, and a duration of time since the last successful authentication attempt with the melodies.

Method 1000 may further comprise removing a melody from, or adding a melody to, the list comprising a plurality of melodies based one any one, or a combination of one or more of the metrics described above.

Determining 1004 that the acquired representation of the melody generated by user 110 and the representation of the reference melody fulfil a similarity condition may, e.g., comprise calculating a degree of similarity between the acquired representation of the melody generated by user 110 and the representation of the reference melody, and determining that the acquired representation of the melody generated by user 110 and the representation of the reference melody fulfil a similarity condition if the calculated degree of similarity exceeds a threshold value. Alternatively, determining 1004 that the acquired representation of the melody generated by user 110 and the representation of the reference melody fulfil a similarity condition may comprise deriving a melody signature from the acquired representation of the melody generated by user 110, calculating a degree of similarity between the melody signature derived from the melody generated by user 110 and a melody signature derived from the representation of the reference melody, and determining that the acquired representation of the melody generated by user 110 and the representation of the reference melody fulfil a similarity condition if the calculated degree of similarity exceeds a threshold value.

It will be appreciated that method 1000 may comprise additional, or modified, steps in accordance with what is described throughout this disclosure. An embodiment of method 1000 may be implemented as software, such as computer program 804, to be executed by a processing unit comprised in the computing device, whereby the computing device is operative to perform in accordance with embodiments of the invention described herein.

The person skilled in the art realizes that the invention by no means is limited to the embodiments described above. On the contrary, many modifications and variations are possible within the scope of the appended claims. For instance, the determining that the acquired representation of the melody generated by user 110 and a representation of a reference melody fulfil a similarity condition may, at least partially, be performed by a different device, e.g., by a network node such as a server or a network node of a cloud environment which is accessible over the Internet. In particular, deriving a representation of the user-generated melody or the reference melody, and magnifying motions of one or more body parts of user 110 by video processing the acquired video sequence are relatively resource consuming, in terms of processing power and/or battery consumption, and may advantageously be performed by an external network node. Accordingly, one may envisage embodiments of the invention which are operative to transmit the acquired representation of the user-generated melody to an external network node for processing, and to authenticate user 110 in response to receiving an indication from the external network node as to whether the similarity condition is fulfilled. Alternatively, an embodiment of the computing device may receive information pertaining to a calculated degree of similarity from the external network node.

The invention claimed is:

1. A computing device for authenticating a user of the computing device, the computing device comprising:
   processing circuitry; and memory containing instructions executable by the processing circuitry whereby the computing device is operative to:
acquire a representation of a melody generated by the user by:
acquiring, from a camera operatively connected to the computing device, a video sequence of the user subvocalizing the melody;
extracting, by video processing the acquired video sequence, motions of one or more body parts of the user, which motions are correlated with the subvocalized melody; and
deriving a representation of the subvocalized melody as a representation of the extracted motions; and
authenticate the user in response to determining that the acquired representation of the melody generated by the user and a representation of a reference melody fulfil a similarity condition.

2. The computing device of claim 1, wherein the instructions are such that the computing device is further operative to acquire the representation of the melody generated by the user by:
acquiring, from a microphone operatively connected to the computing device, audio data of the user vocalizing the melody; and
deriving a representation of the vocalized melody as a representation of the acquired audio data.

3. The computing device of claim 1, wherein the instructions are such that the computing device is further operative to acquire the representation of the melody generated by the user by:
acquiring, from one or more sensors operatively connected to the computing device, nerve signals captured from a throat of the user subvocalizing the melody; and
deriving a representation of the subvocalized melody as a representation of the nerve signals.

4. The computing device of claim 1, wherein the representation of the reference melody is a previously acquired representation of the reference melody generated by the user.

5. The computing device of claim 1, wherein the reference melody is a piece of original music.

6. The computing device of claim 1:
wherein the computing device further comprises a user-interface; and
wherein the instructions are such that the computing device is operative to:
select the reference melody from a list comprising a plurality of melodies; and
request the user, through the user-interface, to generate the selected reference melody.

7. The computing device of claim 6, wherein the instructions are such that the computing device is operative to request the user to generate the selected reference melody by rendering, through the user-interface, a name of the selected reference melody and/or a clue pertaining to the selected reference melody.

8. The computing device of claim 6, wherein the instructions are such that the computing device is operative to select the reference melody from a list comprising a plurality of melodies based on:
one or more metrics pertaining to a user ranking of the melodies;
a popularity of the melodies;
a familiarity of the user with the melodies;
a rate of successful previous authentication attempts with the melodies;
a duration of time since a last time the user has listened to the melodies; and/or
a duration of time since a last successful authentication attempt with the melodies.

9. The computing device of claim 6, wherein the instructions are such that the computing device is operative to remove a melody from, or add a melody to, the list based on:
one or more metrics pertaining to a user ranking of the melodies;
a popularity of the melodies;
a familiarity of the user with the melodies;
a rate of successful authentication attempts with the melodies;
a duration of time since a last time the user has listened to the melodies; and/or
a duration of time since a last successful authentication attempt with the melodies.

10. The computing device of claim 1, wherein the instructions are such that the computing device is operative to determine that the acquired representation of the melody generated by the user and the representation of the reference melody fulfil a similarity condition by:
calculating a degree of similarity between the acquired representation of the melody generated by the user and the representation of the reference melody; and
determining that the acquired representation of the melody generated by the user and the representation of the reference melody fulfil a similarity condition if the calculated degree of similarity exceeds a threshold value.

11. The computing device of claim 1, wherein the instructions are such that the computing device is operative to determine that the acquired representation of the melody generated by the user and the representation of the reference melody fulfil a similarity condition by:
deriving a melody signature from the acquired representation of the melody generated by the user;
calculating a degree of similarity between the melody signature derived from the melody generated by the user and a melody signature derived from the representation of the reference melody; and
determining that the acquired representation of the melody generated by the user and the representation of the reference melody fulfil a similarity condition if the calculated degree of similarity exceeds a threshold value.

12. The computing device of claim 1, wherein the user is authenticated to access the computing device.

13. The computing device of claim 1, wherein the computing device is any one of: a mobile phone, a mobile terminal, a smartphone, a tablet, a personal computer, a computer display, a television, a media player, and a laptop.

14. A method of authenticating a user of a computing device, the method comprising the computing device:
acquiring a representation of a melody generated by the user by:
acquiring, from a camera operatively connected to the computing device, a video sequence of the user subvocalizing the melody;
extracting, by video processing the acquired video sequence, motions of one or more body parts of the user, which motions are correlated with the subvocalized melody; and
deriving a representation of the subvocalized melody as a representation of the extracted motions; and authenticating the user in response to determining that the acquired representation of the melody generated by the user and a representation of a reference melody fulfil a similarity condition.

15. The method of claim 14, wherein the acquiring the representation of the melody generated by the user further comprises:
  acquiring, from a microphone operatively connected to the computing device, audio data of the user vocalizing the melody; and
  deriving a representation of the vocalized melody as a representation of the acquired audio data.

16. The method of claim 14, wherein the acquiring the representation of the melody generated by the user further comprises:
  acquiring, from one or more sensors operatively connected to the computing device, nerve signals captured from a throat of the user subvocalizing the melody; and
  deriving a representation of the subvocalized melody as a representation of the nerve signals.

17. The method of claim 14, wherein the representation of the reference melody is a previously acquired representation of the reference melody generated by the user.

18. The method of claim 14, wherein the reference melody is a piece of original music.

19. The method of claim 14, further comprising:
  selecting the reference melody from a list comprising a plurality of melodies; and
  requesting the user, through a user-interface comprised in the computing device, to generate the selected reference melody.

20. The method of claim 19, wherein the requesting the user to generate the selected reference melody comprises rendering, through the user-interface, a name of the selected reference melody and/or a clue pertaining to the selected reference melody.

21. The method of claim 19, wherein the reference melody is selected from a list comprising a plurality of melodies based on:
  one or more metrics pertaining to a user ranking of the melodies;
  a popularity of the melodies;
  a familiarity of the user with the melodies;
  a rate of successful previous authentication attempts with the melodies;
  a duration of time since a last time the user has listened to the melodies; and/or
  a duration of time since a last successful authentication attempt with the melodies.

22. The method of claim 19, further comprising removing a melody from, or adding a melody to, the list based on:
  one or more metrics pertaining to a user ranking of the melodies;
  a popularity of the melodies;
  a familiarity of the user with the melodies;
  a rate of successful authentication attempts with the melodies;
  a duration of time since a last time the user has listened to the melodies; and/or
  a duration of time since a last successful authentication attempt with the melodies.

23. The method of claim 14, wherein the determining that the acquired representation of the melody generated by the user and the representation of the reference melody fulfil a similarity condition comprises:
  calculating a degree of similarity between the acquired representation of the melody generated by the user and the representation of the reference melody; and
  determining that the acquired representation of the melody generated by the user and the representation of the reference melody fulfil a similarity condition if the calculated degree of similarity exceeds a threshold value.

24. The method of claim 14, wherein the determining that the acquired representation of the melody generated by the user and the representation of the reference melody fulfil a similarity condition comprises:
  deriving a melody signature from the acquired representation of the melody generated by the user;
  calculating a degree of similarity between the melody signature derived from the melody generated by the user and a melody signature derived from the representation of the reference melody; and
  determining that the acquired representation of the melody generated by the user and the representation of the reference melody fulfil a similarity condition if the calculated degree of similarity exceeds a threshold value.

25. The method of claim 14, wherein the user is authenticated to access the computing device.

26. The method of claim 14, wherein the computing device is any one of: a mobile phone, a mobile terminal, a smartphone, a tablet, a personal computer, a computer display, a television, a media player, and a laptop.

27. A non-transitory computer readable recording medium storing a computer program product for authenticating a user of a computing device, the computer program product comprising software instructions which, when run on processing circuitry of the computing device, causes the computing device to:
  acquire a representation of a melody generated by the user by:
    acquiring, from a camera operatively connected to the computing device, a video sequence of the user subvocalizing the melody;
    extracting, by video processing the acquired video sequence, motions of one or more body parts of the user, which motions are correlated with the subvocalized melody; and
  deriving a representation of the subvocalized melody as a representation of the extracted motions; and
  authenticate the user in response to determining that the acquired representation of the melody generated by the user and a representation of a reference melody fulfil a similarity condition.

* * * * *